United States Patent

Röhrle et al.

Patent Number: 5,678,860
Date of Patent: Oct. 21, 1997

[54] TRIP DEVICE FOR A VEHICLE OCCUPANT RESTRAINT SYSTEM

[75] Inventors: Martin Röhrle, Mutlangen; Klaus Böhmler, Schwäbisch Gmünd; Uwe Huber, Alfdorf; Helmut Maiwald, Schechingen, all of Germany

[73] Assignee: TRW Occupant Restraint Systems GmbH, Alfdorf, Germany

[21] Appl. No.: 539,317

[22] Filed: Oct. 4, 1995

[30] Foreign Application Priority Data

Oct. 5, 1994 [DE] Germany .................. 44 35 619.6
Mar. 14, 1995 [DE] Germany .................. 195 09 176.0

[51] Int. Cl.$^6$ .......................... B60R 22/46; B60R 21/32
[52] U.S. Cl. .................. 280/806; 280/734; 200/61.45 R
[58] Field of Search .................... 280/806, 734, 280/735; 200/61.45 R, 61.53

[56] References Cited

U.S. PATENT DOCUMENTS

| | | |
|---|---|---|
| 3,625,068 | 12/1971 | Kelly . |
| 3,625,178 | 12/1971 | Pracher .................. 280/734 |
| 3,662,606 | 5/1972 | Prachar . |
| 4,889,068 | 12/1989 | Tabata et al. .................. 280/806 |
| 5,129,679 | 7/1992 | Specht et al. .................. 280/806 |

*Primary Examiner*—Paul N. Dickson
*Attorney, Agent, or Firm*—Tarolli, Sundheim, Covell, Tummino & Szabo

[57] ABSTRACT

A trip device for a vehicle occupant restraint system comprises a vehicle responsive inertial mass (12) able to be moved in translation in a housing (10) against a return spring (14) between a neutral position and a trip position. An activating pin (22) is provided for activation of an impact fuse (24). To reduce the response time and to prevent an effect of the resistance to actuation of a device activated by the trip device, on the trip behavior of the trip device, the activating pin (22) is acted upon by a spring and is held in a standby position by a catch (26), a control body (16) able to be shifted in translation in the housing (10) is biased by a spring (18) into a neutral position and is functionally arranged between the inertial mass (12) and the catch means (26), and the control body (16) is able to be struck by the inertial mass (12) and on being impinged with a predetermined amount of strike energy is able to be moved out of the neutral position into a release position, in which it releases the catch (26) for release of the activating pin (22).

9 Claims, 2 Drawing Sheets

TRIP DEVICE FOR A VEHICLE OCCUPANT RESTRAINT SYSTEM

BACKGROUND OF THE INVENTION

The present invention relates to a trip device for a vehicle occupant restraint system.

Such a trip device usually comprises a vehicle responsive inertial mass which is movable in translation in a housing against a return spring between a neutral position and a trip position. An activating pin can be provided for activation of a protective device.

For tripping occupant restraining systems in vehicle, as for instance a belt pretensioner or an airbag, electronic, electromechanical and mechanical acceleration sensors are known. Electronic sensors are equipped with complex processing circuitry, which handles the signal of an acceleration pick-up and yield an electrical trip pulse, when the acceleration signal, integrated with respect to time exceeds a predetermined threshold value. Such an electronic acceleration sensor is characterized by a good reproducibility of the trip behavior and a high degree of freedom from spurious operation owing to vibrations in the vehicle. However, it can only be produced with a high degree of technical complexity.

In order to achieve sufficient freedom from spurious operation in case of mechanical acceleration sensors as well it is necessary for the inertial mass employed to move through a certain operating stroke against the action of a return spring before actuation so that the integrating behavior of an electronic processing circuit may be simulated. In order to ensure adequate reproducibility of the trip action, it is necessary for such actuating stroke to amount to some millimeters at least. The inertial mass is urged by the return spring into its neutral position with such a biasing action that it only starts moving on the occurrence of acceleration values which are hardly less than the mean acceleration value, at which tripping is to occur, if accelerate on is continued. In the case of a belt pretensioner or an air bag such mean acceleration value will amount to approximately 12 g. Since however the time elapsing before trip takes place is directly proportional to the displacement of the sensor body and in order to achieve certain reproducibility a relatively large displacement is required, the use of conventional mechanical acceleration sensors does not render it possible to achieve a short response time.

With a view to obtaining a reduction in costs attempts are further being made to design a trip device in such a manner that by having a modular structure the trip able to be achieved with one and the same trip device can be employed in different manners, for example for the direct tripping of an impact pin for the operation of a fuse for a gas generator or for the indirect operation of an impact pin spatially separated from same via an intermediately connected mechanical system. In known trip devices there is then the problem that the resistance to actuation of a device able to be operated by the trip device has its own effect on the trip behavior of the trip device, for example an impact pin indirectly operated via an intermediately placed mechanical transmission system will have higher resistance to actuation than a directly operated one.

Taking such problems as a starting point, one object of the invention is to provide an trip device the trip response time of which is comparable with the trip response time of electronic sensors and the trip behavior of which is independent of the type of activation performed by it.

SUMMARY OF THE INVENTION

According to the present invention, a trip device is provided which comprises a housing with a vehicle-sensitive inertial body movably mounted therein, and an activating pin for activation of a protective device.

The activating pin is acted upon by a spring and is held in a standby position by a catch means. A control body able to be shifted in translation in the housing is biased by a spring into a neutral position and is functionally arranged between the inertial mass and the catch means. The control body is able to be struck by the inertial mass and on being imparted a predetermined amount of strike energy is able to be moved out of the neutral position into a release position, in which it releases the catch means for release of the activating pin. Owing to this two-stage structure of the trip device there is on the one hand achievement of a response time comparable with the response time of an electronic sensor and on the other hand the avoidance of any effect of the resistance to actuation of a device activated by the trip device on the trip behavior of the trip device. The inertial mass will respond even to low acceleration, preferably as from approximately 2 g upward and, given a continuing acceleration, will reach the start of the actual operation stroke with a speed, which may be calculated from the product: effective acceleration times the time required for the displacement effected. When the inertial mass now reaches the control body, it will transmit its kinetic energy to the same essentially as an impact. The control body, which for its part is spring-loaded, will now be shifted into the release position, when the inertial mass has transmitted a predetermined amount of impact energy to it. In the event of the impact energy not being sufficient for tripping, the control body will be moved back into its neutral position by the spring associated with it. As acceleration decreases the inertia mass will be moved by the return spring back into its neutral position again.

In the trip device in accordance with the invention it is possible for the displacement stroke of the inertial mass out of the neutral position into the trip position to be relatively large so that spurious tripping by blows or vibrations is prevented. Since however the inertial mass will be moved out of its neutral position toward the tripped position even by relatively low acceleration effects, the time elapsing between the occurrence of high acceleration values sufficient for tripping and reaching the trip position is noticeably shorter than in the case of conventional mechanical trip device. Since the trip device is activated by impact energy, the resistance to operation of a device activated by the trip device will not have an effect on the trip behavior of the trip device.

In accordance with a preferred embodiment of the invention of the invention the activating pin is an impact pin and the fuse is an impact fuse on which the impact pin acts.

In keeping with yet another possible form of the invention the fuse is spatially separated from the activating pin and the activating stroke of the activating pin is transmitted to the fuse by a transmission mechanism such as a bowden cable.

BRIEF DESCRIPTION OF THE DRAWINGS

Further advantageous developments and convenient forms of the invention will be understood from the dependent claims and the following detailed descriptive disclosure of one embodiment thereof in conjunction with the accompanying drawings.

DESCRIPTION OF PREFERRED EMBODIMENTS

Figure 2:
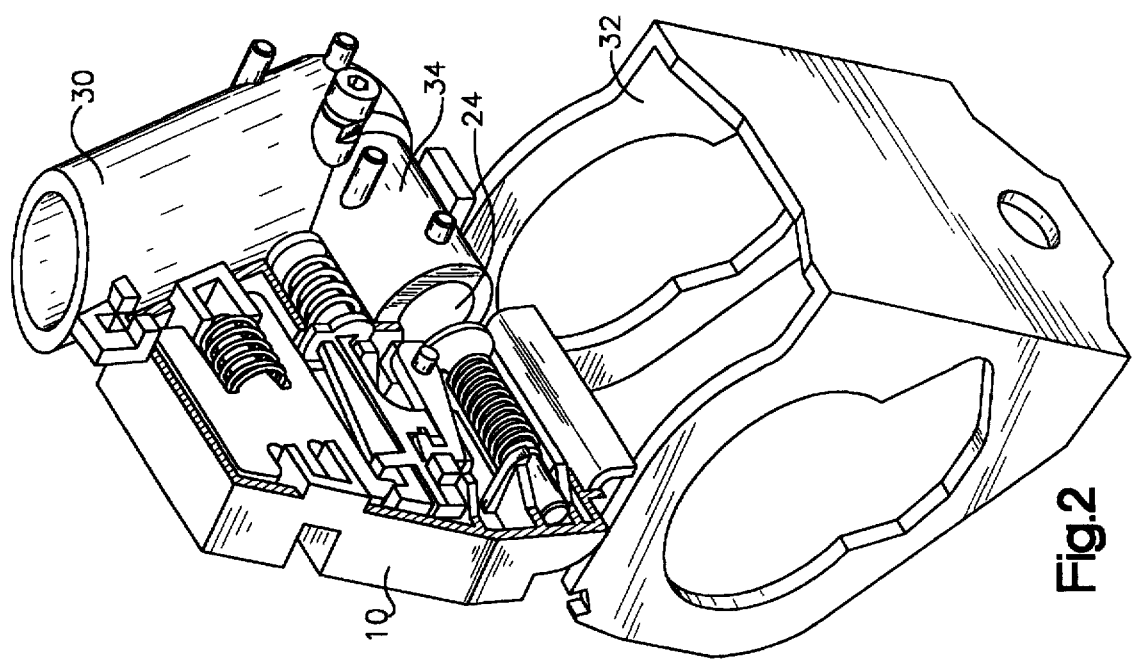
FIG. 2 shows a diagrammatic, partially sectioned perspective elevation of the trip device mounted on a belt retractor frame in accordance with the first advantageous embodiment of the invention.

In a guard housing 10 an inertia mass 12 is mounted for shifting movement in translation against the action of a return spring 14. Adjacent to such inertial mass 12 a control body 16 is arranged inside the housing 10 for shifting movement in translation parallel to the inertial mass 12. The inertial mass 12 has a head 12a fitting into a recess 16a in the control body 16 so that the head 12a extends with play into the recess 16a. This recess 16a is wider than the width of the head 12a so that the head 12a extends with play into the recess 16a. The control body 16 is for its part urged by a compression spring 18 into the neutral position indicated in FIG. 1.

A spring-loaded activating pin 22, which in the first preferred embodiment is in the form of an impact pin, is held by a catch means, to be described infra, in a standby position clear of a fuse 24, which in the present embodiment is an impact fuse. The catch means essentially comprises a catch lever 26, which is pivoted for movement about an axis fixed in relation to the housing and at its one end bears a catch heel 26a, which engages the activating pin 22 and at its other end 26b, bent into a hooked form, is provided with a holding surface, which bears against an associated support surface on the control body 16.

As shown in FIG. 2, the housing 10, is mounted by means of a base 30, on which the cylinder of a pyrotechnic belt protensioner drive is attached, on the frame 32 of a belt retractor. The base 30 serves furthermore to receive the pyrotechnic gas generator 34, which is able to be operated by means of the impact fuse 24.

Figure 1:
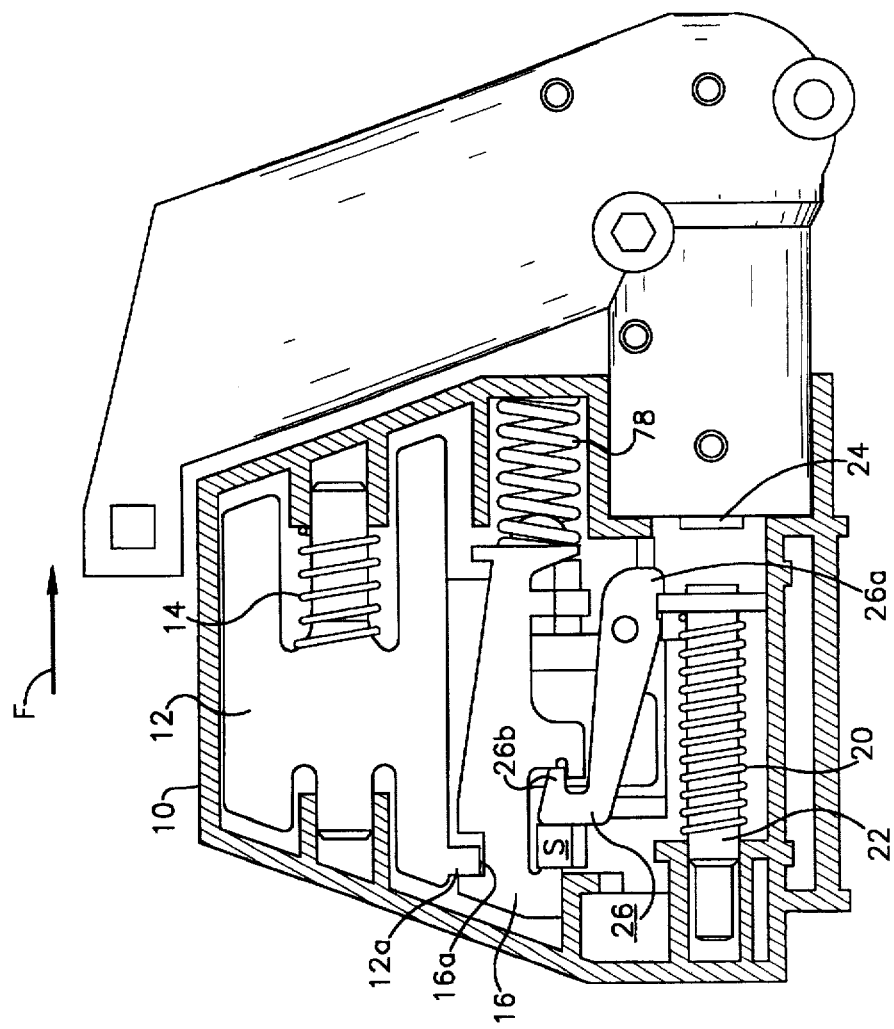
FIG. 1 is a diagrammatic view to indicate a first advantageous embodiment of the trip device.

The direction of fitting of the trip device is indicated by an arrow F in FIG. 1, such direction being the same as the direction of travel. The masses of the inertial mass 12 and of the control body 16 bear a relationship of between approximately 10:1 and 20:1 to one another. The compression spring 18 is substantially larger in its dimensions than the return spring 14. As soon as there is a deceleration of more than 2 g action on the housing 10, the inertial mass 12 will overcome the force of the return spring 14, will be accelerated and will acquire kinetic energy. If the deceleration continues the head 12a will strike against an impact surface in the recess 16a, an impact being transmitted by the inertial mass 12 to the control body 16. If such impact possesses sufficient energy, the control body 16 will be shifted out of its neutral position into its release position with the result that the hook at the ends of the catch lever 26 will come clear of the support surface on the control body 16. The catch lever will then be pivoted under the action of the compression spring 20 and will release the activating pin 22. The same will be accelerated by the compression spring 20 and will kick against the impact fuse, which will then be activated and for its part will operate the pyrotechnic gas generator 34. Owing to the gas under pressure produced by it the linear piston and cylinder unit of the belt pretensioner will be activated.

Figure 3:
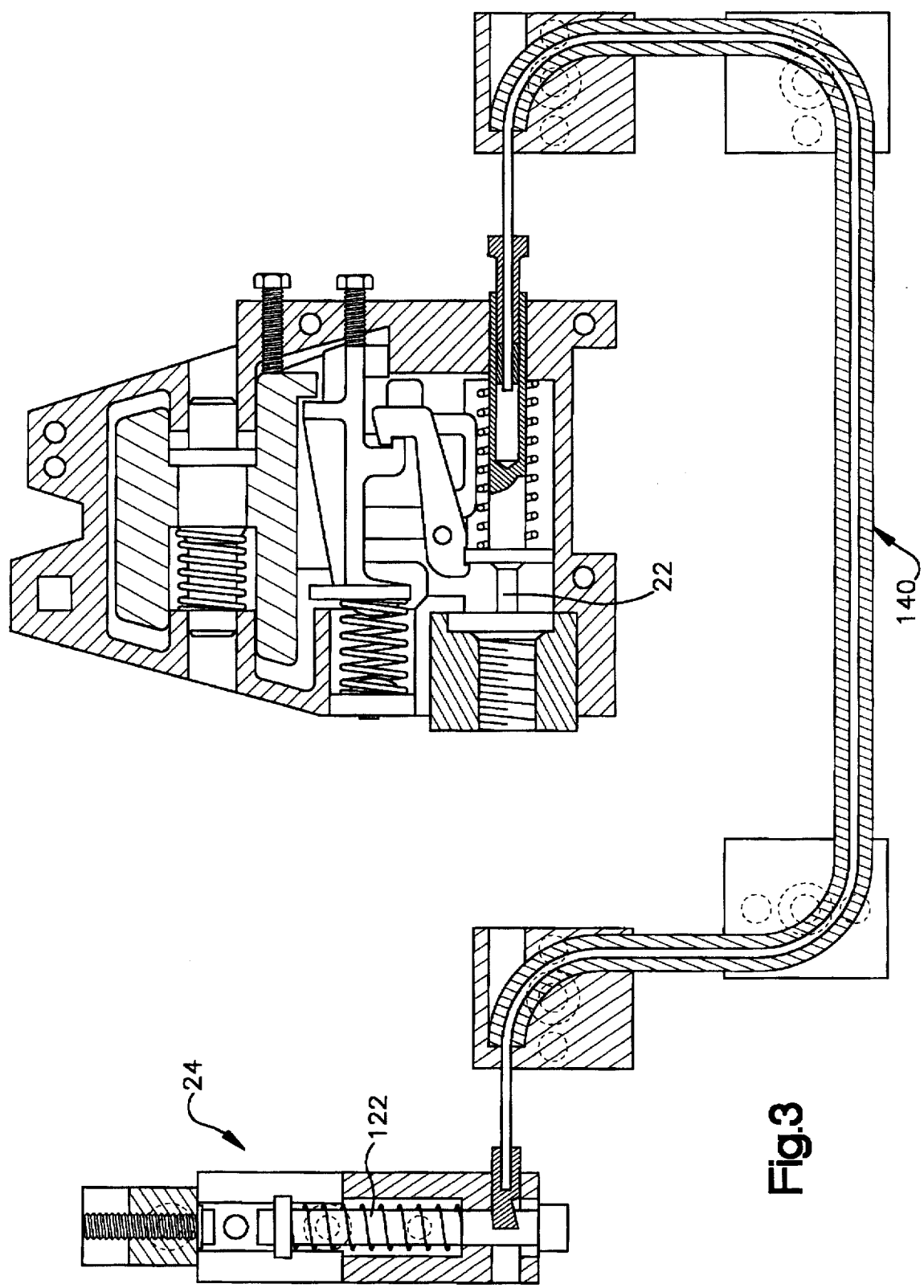
FIG. 3 is a diagrammatic lateral elevation of the trip device in accordance with a second advantageous embodiment of the invention.

Since the arrangement of the fuse will generally depend on the site of mounting of the gas generator fired by it, in the case of an arrangement in accordance with the first embodiment the site of mounting of the trip device is also set. However it has been found that by having a separation in space between the trip device and the gas generator it is possible to choose a site on the vehicle which is for example more suitable for the tripping action. Such a design is represented in FIG. 3. Whereas in the case of an arrangement of the trip device as in the first embodiment the activating pin 22 acts directly on the fuse 24, in the second embodiment of the invention illustrated in FIG. 3 the fuse 24 is separated in space from the activating pin 22. The stroke of the activating pin 22 is transmitted via a transmission device to the fuse. In FIG. 3 the trip device as in FIGS. 1 and 2 will be seen. The only departure from this trip device is that on release of the activating pin 22 the same performs a movement to the right in terms of FIGS. 1 and 2, whereas on release in FIG. 3 it performs a movement to the left. Such activation stroke is transmitted to a bowden cable 140 and by the same to a lever for the release of an impact pin 122, which operates the fuse. Owing to the intermediate arrangement of the transmission device, here in the form of the bowden cable 140, between the activating pin 22 and the impact pin 122 it is possible for the fuse to be separated in space from the trip device. In the case of the embodiment the advantage of the trip device in accordance with the invention is particularly relevant that the resistance to operation of a device activated by the trip device will not have an effect on the tripping behavior of the trip device. Although the resistance to actuation of the bowden cable employed in the second embodiment between the activating pin and the fuse may be substantially higher than the resistance to actuation of the directly operated impact pin utilized in the first embodiment, the trip behavior of the trip device will not be changed.

What is claimed is:

1. A trip device for a vehicle occupant restraint system, comprising:

a housing;

an inertial body movably mounted in said housing and spring biased towards a normal rest position;

a spring loaded activating pin movably mounted in said housing;

catch means engaging and holding said activating pin in a standby position; and a control body translationally movable in said housing and arranged between said inertial body and said activating pin, said control body being spring biased to a normal rest position and being movable against spring force towards a release position;

said control body and said catch means each having a respective holding member for mutual cooperation, said holding members being in engagement with each other when said control body is in said rest position and becoming disengaged when said control body moves to said release position;

said control body having an abutment face spaced a predetermined distance from an opposed surface portion of said inertial body;

said catch means comprising a two-armed lever pivotally mounted in said housing and having a first end with a holding heel engaging said activating pin and a second end provided with said holding member engaging said control body.

2. The trip device of claim 1 wherein said inertial and control bodies are movable parallel to each other.

3. The trip device of claim 1 wherein said inertial and control bodies are arranged adjacent each other.

4. The trip device of claim 1 wherein said holding member is formed by a hook on said second end of the two-armed lever.

5. The trip device of claim 1 wherein said inertial and control bodies have masses in a relationship of between 10:1 and 20:1.

6. The trip device of claim 1 wherein said activating pin is an impact pin for cooperation with an impact fuse.

7. The trip device of claim 6 wherein a pyrotechnic gas generator provided with said impact fuse is mounted in said housing with said impact fuse spaced from and facing said impact pin.

8. The trip device of claim 1 wherein said spring bias acting on said inertial body is so dimensioned that said inertial body starts moving away from said normal rest position under an acceleration of about 2 g.

9. A trip device for a vehicle occupant restraint, system comprising:

a housing;

an inertial body movably mounted in said housing and spring biased towards a normal rest position;

a spring loaded activating pin movably mounted in said housing;

catch means engaging and holding said activating pin in a standby position;

a control body translationally movable in said housing and arranged between said inertial body and said activating pin, said control body being spring biased to a normal rest position and being movable against spring force towards a release position;

said control body and said catch means each having a respective holding member for mutual cooperation, said holding members being in engagement with each other when said control body is in said rest position and becoming disengaged when said control body moves to said release position;

said control body having an abutment face spaced a predetermined distance from an opposed surface portion of said inertial body;

a spring loaded impact pin spatially separated from said activating pin;

release means engaged with said impact pin; and a bowden cable connecting said release means to said activating pin, said bowden cable transmitting movement of said activating pin to said release means to cause said release means to release said impact pin.

* * * * *